United States Patent
Wada

(10) Patent No.: US 10,807,548 B2
(45) Date of Patent: Oct. 20, 2020

(54) VEHICLE FRONT BODY STRUCTURE

(71) Applicant: SUBARU CORPORATION, Tokyo (JP)

(72) Inventor: Yoshio Wada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 46 days.

(21) Appl. No.: 16/259,331

(22) Filed: Jan. 28, 2019

(65) Prior Publication Data

US 2019/0299889 A1    Oct. 3, 2019

(30) Foreign Application Priority Data

Mar. 29, 2018    (JP) .................................. 2018-063392

(51) Int. Cl.
*B62D 21/15*    (2006.01)
*B62D 25/08*    (2006.01)
*B60R 19/34*    (2006.01)

(52) U.S. Cl.
CPC ............ *B60R 19/34* (2013.01); *B62D 21/152* (2013.01); *B62D 25/08* (2013.01)

(58) Field of Classification Search
CPC ...... B62D 21/15; B62D 21/152; B62D 25/08; B62D 25/20; B60R 19/34; B60R 2021/0023
See application file for complete search history.

(56) References Cited

U.S. PATENT DOCUMENTS

| 9,010,845 B1 | 4/2015 | Ramoutar et al. |
| 2012/0248820 A1* | 10/2012 | Yasui ...................... B60R 19/34 296/187.09 |
| 2013/0320709 A1* | 12/2013 | Kuwabara ............ B62D 25/082 296/187.09 |

(Continued)

FOREIGN PATENT DOCUMENTS

| JP | 2009-248603 A | 10/2009 |
| JP | 2014-240231 A | 12/2014 |

(Continued)

OTHER PUBLICATIONS

Notification of reason(s) for refusal issued in corresponding Japanese Patent Application No. 2018-063392 dated Sep. 10, 2019 (with English translation).

*Primary Examiner* — Gregory A Blankenship
(74) *Attorney, Agent, or Firm* — Troutman Pepper Hamilton Sanders LLP

(57) ABSTRACT

A vehicle front body structure includes a pair of right and left side frames, a bumper beam, and a load transfer member. The pair of side frames extends in a front-to-rear direction of a vehicle. The bumper beam disposed in front of the side frames and extending in a vehicle width direction. The load transfer member is coupled to a side surface of each of the side frames facing outward in the vehicle width direction, and obliquely extends outward in the vehicle width direction, toward the bumper beam. The load transfer member includes a first deformation facilitating portion formed in an edge of the load transfer member facing a rear of the vehicle at a position far from an end of the load transfer member facing inward in the vehicle width direction by a distance equal to or longer than a width of the side frame in a planer view.

7 Claims, 6 Drawing Sheets

(56) References Cited

U.S. PATENT DOCUMENTS

| | | | |
|---|---|---|---|
| 2014/0008924 A1* | 1/2014 | Han | B60R 19/18 |
| | | | 293/133 |
| 2014/0062106 A1* | 3/2014 | Han | B60R 19/34 |
| | | | 293/133 |
| 2014/0159420 A1* | 6/2014 | Hashimoto | B62D 21/152 |
| | | | 296/187.1 |
| 2014/0361561 A1* | 12/2014 | Kuriyama | B62D 25/082 |
| | | | 293/133 |
| 2015/0028606 A1* | 1/2015 | Eckert | B60R 19/34 |
| | | | 293/133 |
| 2015/0076862 A1* | 3/2015 | Abe | B62D 25/082 |
| | | | 296/187.1 |
| 2015/0274209 A1* | 10/2015 | Basappa | B60R 19/04 |
| | | | 180/271 |
| 2015/0298634 A1* | 10/2015 | Hara | B60R 19/24 |
| | | | 293/133 |
| 2015/0314742 A1* | 11/2015 | Kato | B60R 19/34 |
| | | | 293/155 |
| 2015/0329144 A1* | 11/2015 | Hara | B60R 19/24 |
| | | | 296/187.09 |
| 2015/0336525 A1* | 11/2015 | Nam | B60R 19/04 |
| | | | 296/187.1 |
| 2016/0059810 A1* | 3/2016 | Watanabe | B62D 21/152 |
| | | | 293/133 |
| 2016/0121931 A1* | 5/2016 | Tamaoki | B62D 21/02 |
| | | | 296/187.09 |
| 2016/0167712 A1* | 6/2016 | Ogawa | B62D 25/082 |
| | | | 296/187.1 |
| 2016/0318469 A1* | 11/2016 | Matsumoto | B60R 19/34 |
| 2017/0036699 A1* | 2/2017 | Asai | B62D 25/082 |
| 2017/0106823 A1* | 4/2017 | Lieven | B60R 19/34 |
| 2017/0274851 A1* | 9/2017 | Schneider | B60R 19/24 |
| 2017/0274934 A1* | 9/2017 | Elliott | B62D 21/155 |
| 2018/0194402 A1* | 7/2018 | Grattan | B62D 21/152 |
| 2018/0244225 A1* | 8/2018 | Nakayama | B62D 21/152 |
| 2019/0161037 A1* | 5/2019 | Yoshida | B60R 19/34 |
| 2019/0299889 A1* | 10/2019 | Wada | B60R 19/34 |
| 2019/0315410 A1* | 10/2019 | Shinya | B62D 25/08 |

FOREIGN PATENT DOCUMENTS

| | | |
|---|---|---|
| JP | 2015-137082 A | 7/2015 |
| JP | 2015-189407 A | 11/2015 |

* cited by examiner

VEHICLE FRONT BODY STRUCTURE

The present application claims priority from Japanese Patent Application No. 2018-063392 filed on Mar. 29, 2018, the entire contents of which are hereby incorporated by reference.

BACKGROUND

1. Technical Field

The present invention relates to a vehicle front body structure, more specifically to a vehicle front body structure including load transfer members each disposed outside a front side frame in the vehicle width direction and obliquely extending outward in the vehicle width direction, toward the front of the vehicle.

2. Related Art

In recent years, various technologies for absorbing a collision energy has been proposed. With these technologies, when a vehicle collides with an object such as a barrier at a position outside a front side frame in the vehicle width direction (hereinafter referred to as "small overlap crash"), the collision load is transferred to the front side frame to absorb the collision energy.

For example, Japanese Unexamined Patent Application Publication (JP-A) No. 2015-189407 discloses this technology for absorbing a collision energy.

JP-A No. 2015-189407 discloses a gusset including a gusset body having a rectangular closed cross-section, a fixed portion connected to the rear end of the gusset body and fixed to the front side frame, and beads formed on the upper and lower surfaces of the fixed portion.

With the technology disclosed in JP-A No. 2015-189407, in a small overlap crash of the vehicle, (a) the bumper beam collides with the front end of the gusset body; (b) the collision load transferred to the gusset body is inputted to the side surface of the front side frame facing outward in the vehicle width direction via the fixed portion; (c) the fixed portion of the gusset is bent from the beads; and (d) the rear end of the gusset body pushes the front side frame to the inside of the vehicle in the vehicle width direction, so that the front side frame is buckled and distorted. By this means, it is possible to effectively absorb the collision energy.

SUMMARY OF THE INVENTION

An aspect of the present invention provides a vehicle front body structure including: a pair of right and left side frames extending in a front-to-rear direction of a vehicle; a bumper beam disposed in front of the side frames and extending in a vehicle width direction; and a load transfer member coupled to a side surface of each of the side frames facing outward in the vehicle width direction, and obliquely extending outward in the vehicle width direction, toward the bumper beam. The load transfer member includes a first deformation facilitating portion formed in an edge of the load transfer member facing a rear of the vehicle at a position far from an end of the load transfer member facing inward in the vehicle width direction by a distance equal to or longer than a width of the side frame in a planer view.

DETAILED DESCRIPTION

Figure 1:
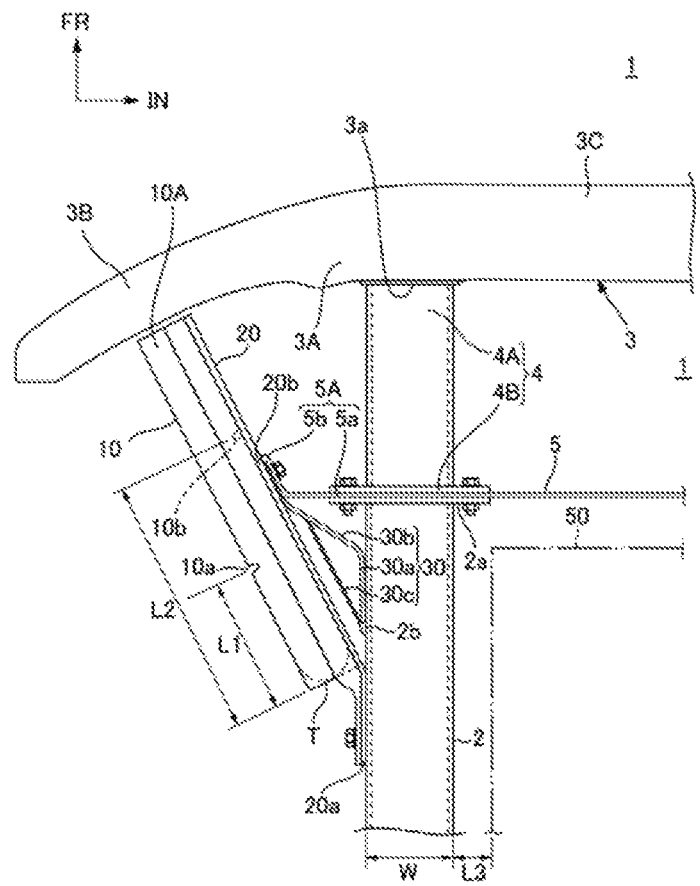
FIG. 1 is a plan view illustrating the front body structure of a vehicle according to an example of the present invention.

Hereinafter, an example of the present invention will be described with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

With the technology disclosed in JP-A No. 2015-189407, the beads are formed on the fixed portion (rear end of the gusset) fixed to the front side frame, and therefore the gusset is immediately bent from the beads when the collision load is inputted to the gusset.

Then, after the gusset is bent, the inputted collision load is applied directly to the front side frame via the gusset, and therefore the degree of deformation of the front side frame may be increased.

In this case, it is possible to effectively absorb the collision energy, but, if an in-vehicle device such as an engine is disposed inside the front side frame in the vehicle width direction, the in-vehicle device may be damaged or broken.

Figure 2:
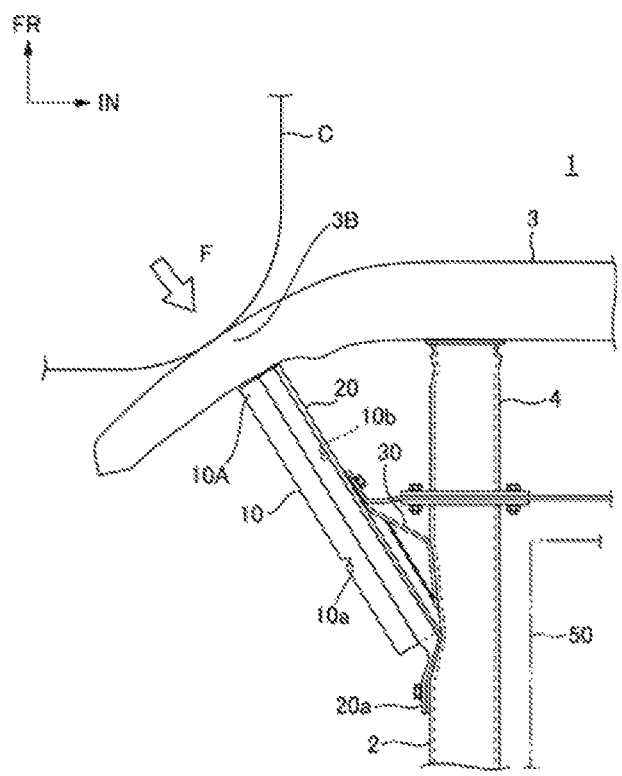
FIG. 2 is a schematic view illustrating a state just after a small overlap crash of the vehicle.
Figure 3:
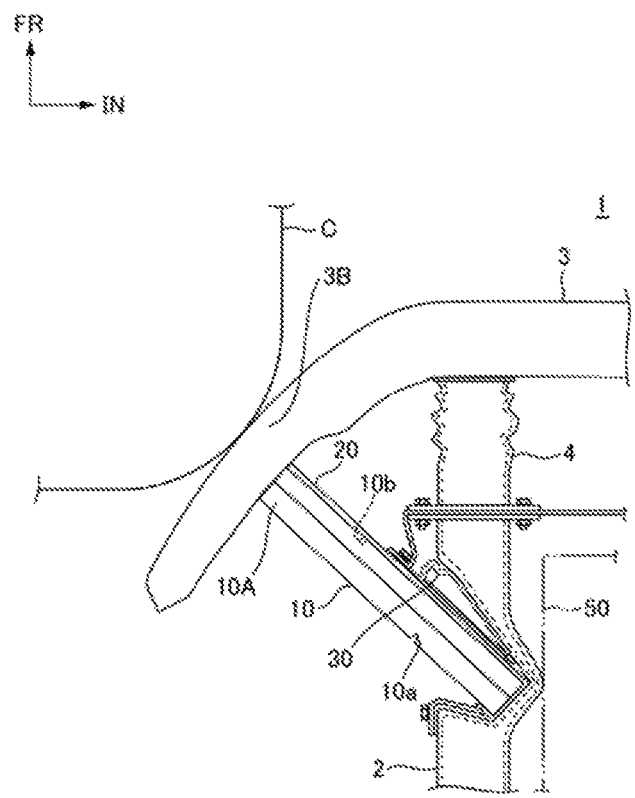
FIG. 3 is a schematic view illustrating a state following FIG. 2.
Figure 4:
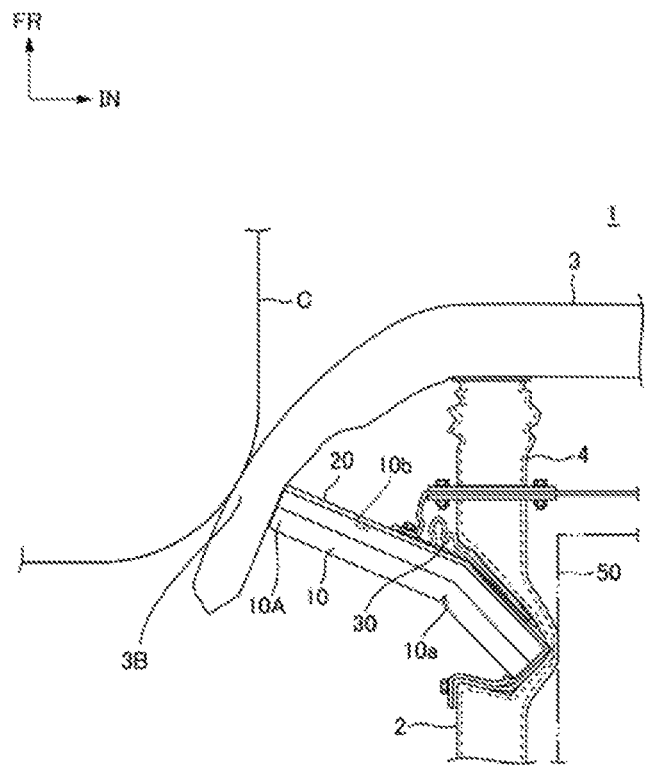
FIG. 4 is a schematic view illustrating a state following FIG. 3.
Figure 5:
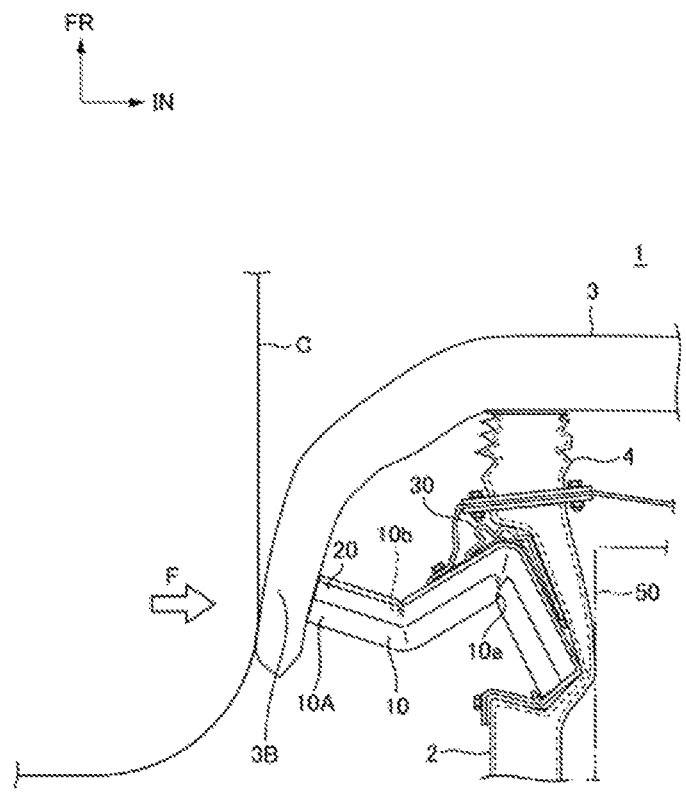
FIG. 5 is a schematic view illustrating a state following FIG. 4.
Figure 6:
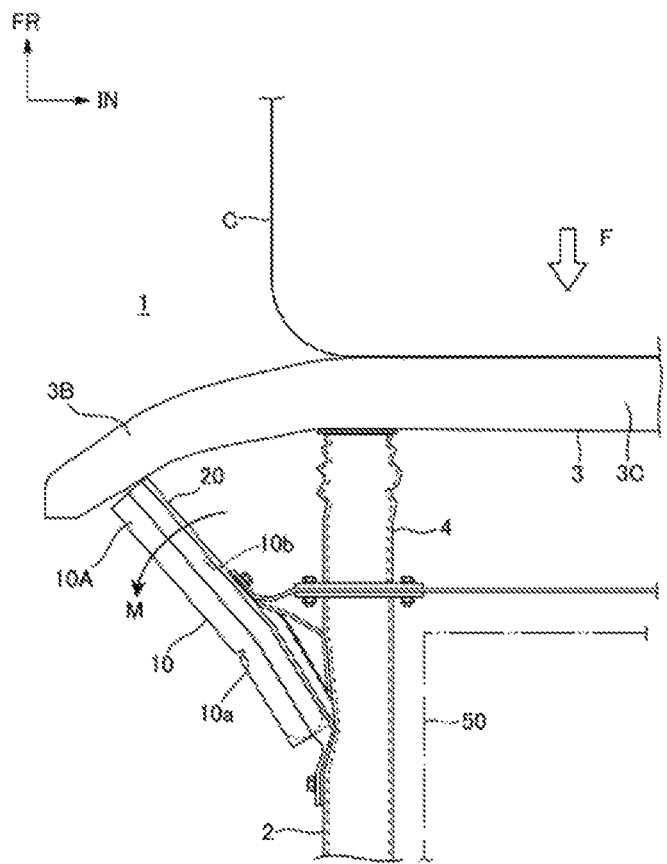
FIG. 6 is a schematic view illustrating a full-width crash of the vehicle.

It is desirable to provide a vehicle front body structure capable of effectively absorbing the collision energy while reducing the degree of deformation of the front side frames in a small overlap crash of a vehicle. FIG. 1 is a plan view illustrating the front body structure of a vehicle according to the present example; FIG. 2 is a schematic view illustrating a state just after a small overlap crash of the vehicle; FIG. 3 is a schematic view illustrating a state following FIG. 2; FIG. 4 is a schematic view illustrating a state following FIG. 3; FIG. 5 is a schematic view illustrating a state following FIG. 4; and FIG. 6 is a schematic view illustrating a full-width crash of the vehicle. Here, in the figures, "FR" denotes front, and "IN" denotes the vehicle width direction, and "right" and "left" are defined as a passenger faces the front of the vehicle. Moreover, with the present example, the right part and the left part of the vehicle front body structure in the vehicle width direction are approximately the same, and therefore, hereinafter only the left part will be described, and the description of the right part is omitted except when necessary.

As illustrated in FIG. 1, with the present example, the front body structure of a vehicle 1 includes a pair of front side frames 2, 2 extending along the front-to-rear direction of the vehicle 1 (the right front side frame 2 is omitted in the figure); a bumper beam 3 disposed in front of the pair of front side frames 2, 2; an impact absorber 4 disposed between the front side frame 2 and the bumper beam 3; and a gusset 10 attached to the side surface of the front side frame 2 facing outward in the vehicle width direction. Here, an in-vehicle device 50 such as an engine is disposed between the front side frames 2, 2. Here, the vehicle 1, the front side frame 2, the bumper beam 3, the gusset 10, and the in-vehicle device 50 correspond to "vehicle", "side frame", "bumper beam", "load transfer member", and "contacted member" recited in the claims, respectively.

First, the front side frame 2 will be described. The front side frame 2 is made of a steel plate, and has a rectangular closed cross-section. With the present example, the in-vehicle device 50 is disposed next to the side surface of the front side frame 2 facing inward in the vehicle width direction.

An impact absorber attachment 2a is provided on the front end of the front side frame 2 to fix a rear end 4B of the impact absorber 4 (described later) while a front side frame attachment 5a of an in-vehicle device support member 5 (described later) is sandwiched between the impact absorber attachment 2a and a rear end 4B (described later) of the impact absorber 4.

Here, the in-vehicle device support member 5 will be described. The in-vehicle device support member 5 includes a main body (not illustrated) configured to support an in-vehicle device such as a radiator (not illustrated), and an extension portion 5A extending in the opposite directions from both ends of the main body in the vehicle width direction. The extension portion 5A includes a front side frame attachment 5a attached to the front side frame 2, and a gusset support member attachment 5b disposed outside the front side frame 5a in the vehicle width direction and attached to a gusset support member 20 (described later).

Next, the bumper beam 3 will be described. The bumper beam 3 is made of a steel plate, and has a rectangular closed cross-section. The bumper beam 3 is provided behind a bumper (not shown) made of, for example, resin, and extends along the vehicle width direction. This bumper beam 3 is curved such that a central part 3C is located forward more than left and right portions 3A, 3A in the vehicle width direction.

The bumper beam 3 includes an impact absorber attachment 3a disposed behind the left position 3A to attach the impact absorber 4, and a flared portion 3B disposed outside the impact absorber attachment 3a in the vehicle width direction and extending along the vehicle width direction.

Next, the impact absorber 4 will be described. The impact absorber 4 is a so-called "crash box", which is crushed in the axial direction (font-to-rear direction of the vehicle 1) to absorb the collision energy when a collision load F is inputted from the front of the vehicle 1 (see, for example, FIG. 2). This impact absorber 4 is now well-known, and therefore detailed description is omitted. For example, the impact absorber 4 may be made of a steel plate and have a rectangular closed cross-section.

The impact absorber 4 is fixed to the impact absorber attachment 3a of the bumper beam 3 at the front end 4A by welding or bolting. In addition, the impact absorber 4 is fixed to the front side frame 2 by bolting while the front side frame attachment 5a of the in-vehicle device support member 5 is sandwiched between the rear end 4B and the impact absorber attachment 2a of the front side frame 2.

Next, the gusset 10 will be described. The gusset 10 is formed by bending a member made of a steel plate to make an M-shaped or C-shaped cross section. The gusset 10 attached to the front side frame 2 obliquely extend outward in the vehicle width direction, toward the front of the vehicle 1.

With the present example, the gusset 10 is attached to the front side frame 2 via the gusset support member 20. In addition, one edge of the gusset 10 is open outward in the vehicle width direction, and when the gusset 10 is attached to the front side frame 2, the open edge faces the rear of the vehicle 1.

Here, the gusset support member 20 will be described. The gusset support member 20 is formed by bending a member made of a steel plate to make an approximately C-shaped cross section. The gusset support member 20 includes a front side frame attachment 20a and a support member attachment 20b. The front side frame attachment 20a is attached to the front side frame 2 at the end of the side surface of the gusset support member 20 facing the rear of the vehicle 1, and the support member attachment 20b is attached to the gusset support member attachment 5b of the in-vehicle device support member 5 at a position near the center of the side surface of the gusset support member 20 in the longitudinal direction.

The gusset 10 is fixed to the gusset support member 20 by welding or bolting while the gusset 10 is fitted in the gusset support member 20 between the side walls of the gusset support member 20.

In addition, the gusset support member 20 is fixed to the front side frame 2 by bolting while the front side frame attachment 20a is aligned with the side surface of the front side frame 2 facing outward in the vehicle width direction, and the support member attachment 20b is aligned with the gusset support member attachment 5b of the in-vehicle device support member 5. The gusset support member 20 may be attached to the front side frame 2 by bolting and welding, or only by welding.

With the present example, a pushing member 30 is disposed between the gusset 10 (gusset support member 20) attached to the front side frame 2 and the front side frame 2. Here, the pushing member 30 corresponds to "pushing member" recited in the claims.

Here, the pushing member 30 will be described. The pushing member 30 is made of a steel plate and is triangle in cross section. The pushing member 30 includes a first side wall 30a, a second side wall 30b and a third side wall 30c. The pushing member 30 includes a rear extension and a front extension (not illustrated). The rear extension is attached to the front side frame 2 and the gusset support member 20 on the side where the first side wall 30a crosses the third side wall 30c. Meanwhile, the front extension is attached to the in-vehicle device support member 5 and the gusset support member 20 on the side where the second side wall 30b crosses the third side wall 30c.

The pushing member 30 is attached to the front side frame 2 and the gusset 10 by (a) inserting the rear extension into a pushing member attachment portion 2b formed on the front side frame 2; and (b) sandwiching the front extension between the support member attachment 20b of the gusset support member 20 and the gusset support member attachment 5b of the in-vehicle device support member 5 and bolting.

With the present example, the gusset 10 includes a first cutout 10a formed in one edge of the gusset 10 facing the rear of the vehicle 1 and a second cutout 10b formed in the other edge facing the front of the vehicle 1, as well as the above-described components. Here, the first cutout 10a and the second cutout 10b correspond to "first deformation facilitating portion" and "second deformation facilitating portion" recited in the claims.

Provided that the end of the gusset 10 facing inward in the vehicle width direction is formed in an arc shape indicated as a dashed line in FIG. 1, the first cutout 10a is formed at a position far from a top T of the arc by a distance equal to or longer than a width W of the front side frame 2 (distance L1). With the present example, the cutout 10a is formed in the gusset 10. However, this is by no means limiting, and the thickness of this portion for the cutout 10a may be reduced instead of forming the cutout 10a.

Meanwhile, the second cutout 10b is formed at a position far from the top T of the end portion of the gusset 10 by a distance L2 which is longer than the distance L1. Here, with the present example, although the gusset support member 20 is disposed to cover the second cutout 10b, another cutout may be formed in the gusset support member 20 at a position corresponding to the second cutout 10b. Alternatively, the thickness of the portion for the second cutout 10b may be reduced, in the same way as the first cutout 10a.

When the predetermined collision load F is inputted to the gusset 10, the gusset 10 is bent from the first cutout 10a and the second cutout 10b (see FIG. 5). Details of the first cutout 10a and the second cutout 10b will be described later.

Here, for example, when the distance between the side surface of the front side frame 2 facing inward in the vehicle width direction and the in-vehicle device 50 is defined as a distance L3, it is preferred that the distance L1 defined to form the first cutout 10a is substantially the same as the sum of the width W of the front side frame 2 and the distance L3.

By this means, when the deformed front side frame 2 contacts the in-vehicle device 50 (see FIG. 5), the gusset 10 is effectively bent outside more than the side surface of the front side frame 2 facing outward in the vehicle width direction. That is, with the present example, when the gusset 10 is bent from the first cutout 10a, it is possible to prevent a situation where part of the edge of the gusset 10 facing the rear side of the vehicle between the cutout 10a and the bumper beam 3 contacts the front side frame 2 so that the gusset 10 cannot be bent.

Next, the states of the front body structure of the vehicle 1 with the above-described configuration in a small overlap crash will be described with reference to FIGS. 2 to 5.

As illustrated in FIG. 2, in a small overlap crash of the vehicle 1, that is, when the vehicle 1 collides with an object C such as a barrier at the flared portion 3B of the bumper beam 3, the collision load F is applied to the gusset 10 via the flared portion 3B. Then, the front end of the flared portion 3B moves to the rear of the vehicle 1 and the impact absorber 4 is gradually crushed, as the collision load F is applied.

When the collision load F is inputted to the gusset 10, the front side frame attachment 20a of the gusset support member 20 weaker than the gusset 10 is first deformed, and then the gusset 10 pushes the side surface of the front side frame 2 facing outward in the vehicle width direction via the gusset support member 20. Here, at this time, the collision load F is applied in an oblique direction from the front of the vehicle 1 toward the inside of the vehicle 1 in the vehicle width direction. The side surface of the front side frame 2 facing outward is gradually deformed inward in the vehicle width direction, as the collision load F is applied.

In this case, with the present example, the pushing member 30 is disposed between the front side frame 2 and the gusset 10. Therefore, as the collision load F is applied to the gusset 10, the front side frame 2 is pushed not only by the edge of the gusset 10 facing inward in the vehicle width direction but also by the pushing member 30.

That is, with the present example, the front side frame 2 is pushed by the edge of the gusset 10 facing inward in the vehicle width direction and the pushing member 30, that is, pushed by a wide contact surface. Therefore, it is possible to increase the area of the deformation of the front side frame 2 while restricting the gusset 10 from entering the front side frame 2, and consequently to effectively absorb the collision energy.

Moreover, with the present example, the pushing member 30 is provided between the front side frame 2 and the gusset 10. Therefore, it is possible to turn the gusset 10 with respect to the position at which the gusset 10 is coupled to the front side frame 2 so as to sufficiently move the front end 10A of the gusset 10 toward the rear of the vehicle 1 (see FIGS. 2 to 4). Therefore, with the present example, it is possible to immediately bend the gusset 10 from the first cutout 10a.

Then, as the collision load F is applied to the gusset 10, the gusset 10 further pushes and deforms the front side frame 2, while the front end 10A of the gusset 10 moves toward the rear of the vehicle 1, forming into an arch.

FIG. 3 illustrates a state just after the gusset 10 further pushes (enters) the front side frame 2 so that the front side frame 2 contacts the in-vehicle device 50.

In this state where the front side frame 2 contacts the in-vehicle device 50, as the collision load is applied to the gusset 10, the gusset 10 pushes the in-vehicle device 50 such as an engine via the front side frame 2.

At this time, the collision load F is applied to push the in-vehicle device 50. Here, as described above, the first cutout 10a (low-strength portion) is formed in the edge of the gusset 10 facing the rear of the vehicle 1, and therefore the collision load F is also applied to the neighboring part of the cutout 10a of the gusset 10.

Then, as illustrated in FIG. 4, the gusset 10 is bent from the cutout 10a as the collision load F is applied. Therefore, with the present example, the gusset 10 is bent when the front side frame 2 contacts the in-vehicle device 50. As a result, it is possible to prevent the collision load F from being applied to the in-vehicle device 50, and therefore to prevent the in-vehicle device 50 from being damaged or broken.

With the present example, the pushing member 30 which is triangle in cross section is disposed between the front side frame 2 and the gusset 10, and located inside the first cutout 10a in the vehicle width direction. Therefore, it is possible to readily move and bend the gusset 10 for an appropriate angle. Therefore, with the present example, it is possible to effectively prevent the in-vehicle device 50 from being damaged or broken.

After that, as the object C enters the vehicle 1, the direction of application of the collision load F is changed from the oblique direction from the front of the vehicle 1 toward to the inside of the vehicle 1, to the vehicle width direction facing the inside of the vehicle 1 (see FIG. 5).

The second cutout 10b is formed in the edge of the gusset 10 facing the front of the vehicle 1, and therefore the gusset 10 is bent from the second cutout 10b by the collision load F applied to the gusset 10 in the direction toward the inside of the vehicle 1 in the vehicle width direction.

As a result, the entire length of the gusset 10 is reduced in the vehicle width direction, and therefore it is possible to prevent the collision load F from being applied to the in-vehicle device 50 even though the direction of application of the collision load F is changed to the vehicle width direction facing the inside of the vehicle 1. Consequently, it is possible to surely prevent the in-vehicle device 50 from being damaged or broken.

Next, the state of the front body structure of the vehicle 1 in a full-width crash will be described with reference to FIG. 6. As illustrated in FIG. 6, in a full-width crash of the vehicle 1, that is, when the vehicle 1 collides with the object C at the central part 3C of the bumper beam 3 in the vehicle width direction, the bumper beam 3 moves to the rear of the vehicle 1 to crush the impact absorber 4.

As a result, the gusset 10 is pushed by the bumper beam 3 moving to the rear of the vehicle 1, and therefore rotation moment M is generated on the front end 10A of the gusset 10 to rotate the gusset 10 counterclockwise as illustrated in FIG. 6.

Here, the first cutout 10a (low-strength portion) is formed in the edge of the gusset 10 facing the rear of the vehicle 1, and therefore the gusset 10 is bent from the first cutout 10a.

Accordingly, with the present example, the gusset 10 is readily bent in a frontal collision such as a full-width crash, as well as the small overlap crash. Therefore, it is possible to effectively absorb the collision energy without preventing the deformation of the impact absorber 4 and so forth.

As described above, with the present example, the first cutout 10a is formed in the edge of the gusset 10 facing the outside in the vehicle width direction at a position far from the end of the gusset 10 facing the inside of the vehicle 1 in the vehicle width direction by a distance equal to or longer than the width of the front side frame 2 in a planer view. Therefore, in a small overlap crash of the vehicle 1, (a) the gusset 10 turns with respect to the position at which the gusset 10 is coupled to the front side frame 2 to move to the rear of the vehicle 1, so that the front side frame 2 is pushed diagonally backward to deform the front side frame 2; and (b) the gusset 10 is bent from the first cutout 10a at a timing at which the gusset 10 pushes (enters) the front side frame 2 at a predetermined degree to deform the front side frame 2, in particular, at a timing at which it becomes difficult to deform the front side frame 2 inward in the vehicle width direction (for example, at a timing at which the inner surface of the outside wall of the front side frame 2 pushes the inner surface of the inside wall of the front side frame 2 at a predetermined degree in the vehicle width direction, or a timing at which the front side frame 2 contacts the in-vehicle device 50 such as an engine when the in-vehicle device 50 is disposed inside the front side frame 2 in the vehicle width direction.

As described above, with the present example, in a small overlap crash of the vehicle 1, it is possible to prevent the front side frame 2 from unnecessarily being deformed. Therefore, it is possible to prevent the in-vehicle device 50 from being damaged or broken while effectively absorbing the collision energy.

Moreover, with the present example, the second cutout 10b is formed in the gusset 10 as well as the first cutout 10a, and therefore it is possible to more effectively prevent the in-vehicle device 50 from being damaged or broken.

As describe above, with the vehicle front body structure according to the present example, it is possible to effectively absorb the collision energy without unnecessarily deforming the side frame in a small overlap crash, and also ensure the impact absorption performance of the vehicle even in other frontal collisions, despite its simple configuration.

Furthermore, with the present example, the pushing member 30 which is triangle in cross section is disposed between the front side frame 2 and the gusset 10, and therefore it is possible to readily move and bend the gusset 10 for an appropriate angle.

Therefore, with the present example, it is possible to readily bend the gusset 10, and consequently to more effectively prevent the in-vehicle device 50 from being damaged or broken.

Here, with the present example, the gusset 10 is bent when the front side frame 2 contacts the in-vehicle device 50. However, this is by no means limiting, and the in-vehicle device 50 may be replaced with another member. For example, a reinforcement member made of, for example, metal may be disposed between the front side frame 2 and the in-vehicle device 50 to bend and deform the gusset 10 when the front side frame 2 contacts the reinforcement member.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. A vehicle front body structure comprising:
 a pair of right and left side frames extending in a front-to-rear direction of a vehicle;
 a bumper beam disposed in front of the side frames and extending in a vehicle width direction;
 a load transfer member coupled to a side surface of each of the side frames facing outward in the vehicle width direction, and obliquely extending outward in the vehicle width direction, toward the bumper beam, the load transfer member comprising a first deformation facilitating portion formed in an edge of the load transfer member facing a rear of the vehicle at a position far from an end of the load transfer member facing inward in the vehicle width direction by a distance equal to or longer than a width of the side frame in a planer view; and
 a pushing member disposed between the load transfer member and the side frame, and configured to push the side surface of the side frame facing outward, to the inside of the vehicle in the vehicle width direction, when a load is inputted to the load transfer member in a direction at least toward the inside of the vehicle in the vehicle width direction,
 wherein the pushing member has a closed cross-section in the planar view.

2. The vehicle front body structure according to claim 1, wherein a contacted member is disposed inside the side frame in the vehicle width direction, the contacted member being configured to contact the side frame when the side frame is deformed by inputting a load to the load transfer member in a direction at least toward the inside of the vehicle in the vehicle width direction.

3. The vehicle front body structure according to claim 1, wherein:
 the load transfer member comprises a second deformation facilitating portion formed in an edge of the load transfer member facing a front of the vehicle; and
 a distance between the end of the load transfer member and the second deformation facilitating portion is longer than a distance between the end of the load transfer member and the first deformation facilitating portion.

4. The vehicle front body structure according to claim 2, wherein:

the load transfer member comprises a second deformation facilitating portion formed in an edge of the load transfer member facing a front of the vehicle; and a distance between the end of the load transfer member and the second deformation facilitating portion is longer than a distance between the end of the load transfer member and the first deformation facilitating portion.

5. The vehicle front body structure according to claim 2, further comprising a pushing member disposed between the load transfer member and the side frame, and configured to push the side surface of the side frame facing outward, to the inside of the vehicle in the vehicle width direction, when a load is inputted to the load transfer member in a direction at least toward the inside of the vehicle in the vehicle width direction.

6. The vehicle front body structure according to claim 3, further comprising a pushing member disposed between the load transfer member and the side frame, and configured to push the side surface of the side frame facing outward, to the inside of the vehicle in the vehicle width direction, when a load is inputted to the load transfer member in a direction at least toward the inside of the vehicle in the vehicle width direction.

7. The vehicle front body structure according to claim 4, further comprising a pushing member disposed between the load transfer member and the side frame, and configured to push the side surface of the side frame facing outward, to the inside of the vehicle in the vehicle width direction, when a load is inputted to the load transfer member in a direction at least toward the inside of the vehicle in the vehicle width direction.

* * * * *